United States Patent [19]

Anderson et al.

[11] Patent Number: 6,147,149
[45] Date of Patent: Nov. 14, 2000

[54] ADHESIVE CAULKING MATERIAL WHICH CAN MIMIC THE APPEARANCE OF A MULTICOLORED STONE SURFACE

[75] Inventors: Theodore P. Anderson, Uxbridge, Mass.; Lawrence H. Boise, Derry, N.H.; Robert G. Modrak, Franklin, Mass.

[73] Assignee: Glouster Co., Inc., Franklin, Mass.

[21] Appl. No.: 09/261,744

[22] Filed: Mar. 3, 1999

[51] Int. Cl.[7] .................. C08K 3/10; C08K 3/26; C08K 3/18; C08K 3/34
[52] U.S. Cl. .................. 524/407; 524/413; 524/425; 524/431; 524/445; 524/451; 524/492; 523/223; 428/402; 428/446; 428/492; 428/500; 428/688
[58] Field of Search .................. 428/402, 446, 428/492, 500, 688; 523/223; 524/407, 413, 425, 431, 445, 451, 492

[56] References Cited

U.S. PATENT DOCUMENTS

| | | | |
|---|---|---|---|
| 3,514,312 | 5/1970 | Gardiner | 117/49 |
| 4,089,139 | 5/1978 | Moffa et al. | 52/20 |
| 4,166,811 | 9/1979 | Marr et al. | 106/308 M |
| 4,201,746 | 5/1980 | Burd et al. | 422/250 |
| 4,263,196 | 4/1981 | Schumacher et al. | 260/33.6 |
| 4,315,892 | 2/1982 | Stone et al. | 422/101 |
| 4,353,999 | 10/1982 | Blount | 524/3 |
| 4,357,429 | 11/1982 | Blount | 521/100 |
| 4,424,867 | 1/1984 | Mallow | 169/43 |
| 4,430,395 | 2/1984 | Davis et al. | 429/158 |
| 4,536,454 | 8/1985 | Haasl | 428/516 |
| 4,568,400 | 2/1986 | Patterson, Jr. et al. | 156/48 |
| 4,677,001 | 6/1987 | Wade et al. | 427/264 |
| 4,707,276 | 11/1987 | Dodge et al. | 210/789 |
| 4,716,690 | 1/1988 | Szücs | 51/321 |
| 4,727,013 | 2/1988 | Pentak et al. | 430/320 |
| 4,750,457 | 6/1988 | Bonutti | 123/198 D |
| 4,800,676 | 1/1989 | Lockwood, Sr. | 47/24 |
| 4,810,533 | 3/1989 | Smith | 427/292 |
| 4,897,291 | 1/1990 | Kim | 427/393 |
| 4,936,238 | 6/1990 | Childress | 114/77 R |
| 5,044,758 | 9/1991 | Kurtz | 366/77 |
| 5,055,048 | 10/1991 | Vassiliadis et al. | 433/215 |
| 5,064,494 | 11/1991 | Duck et al. | 156/273.5 |
| 5,106,889 | 4/1992 | Hirata et al. | 524/423 |
| 5,118,732 | 6/1992 | Loth et al. | 524/43 |
| 5,143,949 | 9/1992 | Grogan et al. | 523/334 |
| 5,229,439 | 7/1993 | Gueret | 524/13 |
| 5,332,767 | 7/1994 | Reisser et al. | 523/209 |
| 5,348,621 | 9/1994 | Rudy et al. | 162/100 |
| 5,384,880 | 1/1995 | Keller et al. | 385/109 |
| 5,387,189 | 2/1995 | Gory et al. | 604/20 |
| 5,419,045 | 5/1995 | Magdich | 30/145 |
| 5,430,085 | 7/1995 | Acevedo et al. | 524/495 |
| 5,449,582 | 9/1995 | Hsieh et al. | 430/134 |
| 5,452,968 | 9/1995 | Dlugosz | 405/303 |
| 5,462,605 | 10/1995 | Szücs | 134/7 |
| 5,474,804 | 12/1995 | Kubic | 427/202 |
| 5,530,051 | 6/1996 | Hirata et al. | 524/441 |
| 5,541,253 | 7/1996 | Dunaway et al. | 524/832 |
| 5,618,859 | 4/1997 | Maeyama et al. | 523/201 |
| 5,674,337 | 10/1997 | Coombs et al. | 156/71 |
| 5,744,544 | 4/1998 | Dunaway et al. | 524/832 |
| 5,750,628 | 5/1998 | Becker et al. | 528/25 |
| 5,753,742 | 5/1998 | Bumanlag | 524/501 |
| 5,965,635 | 10/1999 | Rancich et al. | 523/176 |

*Primary Examiner*—Kriellion Sanders
*Attorney, Agent, or Firm*—Gilberto M. Villacorta; Corinna M. Pouliquen; Pepper Hamilton LLP

[57] ABSTRACT

An adhesive caulking material comprising granular solid colored particles dispersed in a base formulation is disclosed. The adhesive caulking material exhibits a cosmetic capacity to take on the appearance of a natural or synthetic solid substrate. A method is provided for producing the adhesive caulking material comprising the steps of: (a) providing a base formulation exhibiting a desired background color; and (b) adding to the base formulation an amount of granular solid colored particles effective to achieve a desired appearance. The invention also relates to colored solid chips comprising a coagulated or aggregated mixture comprising a polymeric resin and an amount of one or more pigments sufficient to obtain a desired single- or multi-colored appearance. The chips have a granular shape and have a size in the range from about 0.25 mm to about 20 mm in diameter. A solid material is also described which comprises: (a) a solid substrate comprising a plurality of sections with gaps therebetween; the substrate having a speckled or grainy appearance; and (b) a curable adhesive caulking material comprising granular solid colored particles dispersed in a base formulation, the adhesive caulking material substantially filling the gaps and essentially matching the appearance of the substrate.

13 Claims, No Drawings

ADHESIVE CAULKING MATERIAL WHICH CAN MIMIC THE APPEARANCE OF A MULTICOLORED STONE SURFACE

RELATED APPLICATION

The present application claims the benefit of the priority date of earlier-filed U.S. application Ser. No. 09/134,515, filed Aug. 14, 1998, which has been converted to a provisional application under the provisions of 37 C.F.R.§ 1.53 (c)(2).

1. FIELD OF THE INVENTION

This invention relates to an adhesive caulking material containing solid colored particles dispersed in a base formulation. The caulking material has the capacity to take on the appearance of natural or synthetic solid substrates, including igneous or metamorphic stone. This invention also relates to solid colored chips used in the caulking material.

2. BACKGROUND OF THE INVENTION

Caulking compositions are known that are colored to match existing solid surfaces. For example, U.S. Pat. Nos. 5,674,337 and 5,044,758 disclose addition of pigments to caulk compositions to produce colored caulking material having an essentially homogeneous appearance. These references do not suggest a caulking material which can take on the appearance of a variety of solid surfaces.

U.S. Pat. No. 5,229,439, granted to Gueret, discloses a molded article having the appearance of natural stone. A heat-setting resin, such as a urea formaldehyde resin, is mixed with natural fibers or mineral filler. This mixture is then compressed at high temperature and pressure in a mold to produce a solid part with a natural stone appearance. Gueret mentions only molded articles, and does not suggest that a natural stone appearance could be obtained in any other way. No mention is made of any pigment particles other than mineral fillers. Gueret does not suggest production of a caulk having the appearance of natural stone by incorporating pigment particles into a caulking or sealing compound.

A caulking composition having the capacity to match the appearance of a variety of surfaces, including natural stone surfaces would be useful in sealing or repair of natural or synthetic stone counter-tops and other substrates having a speckled or grainy appearance.

Solid colored particles derived from polymeric resins are disclosed in U.S. Pat. Nos. 5,106,889 and 4,166,811, granted to Hirata et al. and Marr et al., respectively. Hirata et al. describe production of particles by coagulation of a dispersion containing pigment and a resin onto particles of polyvinyl chloride. In one example, the resin is an acrylic resin, which is coagulated by addition of calcium chloride. However, Hirata et al. do not prepare any colored particles larger than 200 $\mu$m, i.e., 0.2 mm, and do not suggest that colored particles could be produced without using a polyvinyl chloride core. In Marr et al., a pigment-resin composite is produced from a dispersion of pigment and an acrylic resin by acidifying the mixture to coagulate the resin. Neither reference suggests that colored particles can be produced by coagulation of a mixture of an acrylic resin and pigment by addition of a metal salt.

3. SUMMARY OF THE INVENTION

The present invention is directed to an adhesive caulking material comprising granular solid colored particles dispersed in a base formulation. The adhesive caulking material exhibits a cosmetic capacity to take on the appearance of a natural or synthetic solid substrate. The term "adhesive caulking material" is meant to include an adhesive caulk, caulk, sealant, or like material.

The invention is further directed to a method for producing the adhesive caulking material by: (a) providing a base formulation exhibiting a desired background color; and (b) adding to the base formulation an amount of granular solid colored particles effective to achieve a desired appearance.

The invention is still further directed to colored solid chips comprising a coagulated or aggregated mixture comprising a polymeric resin and an amount of one or more pigments sufficient to obtain a desired single- or multi-colored appearance. The chips have a granular shape and have a size in the range from about 0.25 mm to about 20 mm in diameter.

The invention is also directed to a process for the preparation of granular solid colored chips comprising: (a) mixing a polymeric resin and one or more pigments until a substantially uniformly dispersed resin mixture is obtained; and (b) adding the resin mixture to a stirred salt solution at an addition rate effective to provide a coagulated or aggregated pigmented resin mixture containing granular solid colored chips having a granular shape, a majority of which granular solid colored chips having a diameter falling within a desired range.

The invention is also directed to a solid material comprising: (a) a solid substrate comprising a plurality of sections with gaps therebetween; the substrate having a speckled or grainy appearance; and (b) a cured or curable adhesive caulking material comprising granular solid colored particles dispersed in a base formulation, the adhesive caulking material substantially filling the gaps and essentially matching the appearance of the substrate.

The adhesive caulking material of the present invention may have a variety of pigments optionally added to it. In addition, a wide variety of base formulations are suitable for use in same, as would be apparent to those of ordinary skill in the art after due consideration of the disclosure provided herein. In particular, the base formulation may be aqueous-based or non-aqueous-based, with the resulting caulk preparations finding application in a wide variety of environments, as discussed further below.

The present invention allows a new way of designing solid surfaces in which substantially no gaps between, for example, tiles or sections of the solid surfaces can be perceived due to the substantial matching of the appearance of the natural or synthetic solid surface by the adhesive caulking material disclosed herein. Moreover, the invention also provides a method of repairing a damaged natural or synthetic solid substrate comprising applying in, on, or about the damaged area an effective amount of an adhesive caulking material comprising granular solid colored particles dispersed in a base formulation. Once again, because of the cosmetic capacity exhibited by the adhesive caulking material, the repaired area takes on the appearance of the natural or synthetic solid substrate. A variety of damages to the solid substrate can be repaired, including but not limited to chips, cracks, or breaks in, on, or about the solid substrate.

A more detailed discussion of the present invention is presented below, which is intended to provide additional illustrations of the invention.

4. DETAILED DESCRIPTION OF THE INVENTION

The adhesive caulking material of this invention comprises a base formulation and granular solid colored particles. This material can take on the appearance of a natural or synthetic solid substrate having gradations in color, brightness, or both, which lend a speckled or grainy appearance to the substrate. The natural or synthetic solid substrate is a solid surface material, a composite laminate material, such as FORMICA, tile, wood, coral, natural igneous or sedimentary stone, including granite, sandstone and quartz, or synthetic stone having the appearance of igneous or sedimentary stone. A solid surface material is one which is uniform in color and texture, so that a scratch in the surface does not uncover material having a different color or texture. In preferred embodiments of this invention, the adhesive caulking material takes on the appearance of a single- or multi-colored aggregate substrate having areas of different color and/or brightness from the background area, e.g., granite, sandstone or coral. The natural or synthetic solid substrate (or solid material, as the case may be) can be part of a floor, wall, ceiling, counter top, back splash, bath tub, shower, sink, bar or decorative facade.

When the caulking material of this invention is used to fill gaps between sections of these substrates, the combination of the substrate and the cured or curable caulk in the gaps comprises a new surface having an appearance heretofore unattainable. The gaps between sections are of a size usually encountered in construction, and commonly filled in with a caulking material. For example, a wall or floor constructed from tiles having a speckled or grainy appearance, e.g., the appearance of granite or sandstone, comprises substrate sections (the tiles) with relatively narrow gaps therebetween. When these gaps are filled with the caulk of this invention, formulated to match the appearance of the tiles, the surface comprising the substrate sections and the cured caulk has an essentially uniform appearance. If conventional caulk having a homogeneous appearance had been used, the cured caulk in the gaps would have a very different appearance from the substrate sections. With conventional technology, the only way to achieve an essentially uniform appearance was to install a single large piece of the substrate, obviously an expensive and inconvenient solution.

The base formulation is produced, for example, by adding pigment or filler to an aqueous mixture of a polymeric resin (including but not limited to acrylics, styrenes, styrene-acrylics, styrene-butadienes, vinyl acetates, ethylene-vinyl acetates, siliconized resins (e.g., silanes), urethanes and the like), then adding a surface-active agent and mixing for a time sufficient to provide a substantially uniform base formulation. Optionally, the pigment or filler imparts a color to the base formulation which aids in matching a particular surface. Preferably, the desired aqueous mixture of polymeric resin is produced by combining a water-based polymeric resin with a plasticizer, a coalescing solvent, a surface-active agent and a thickening agent, and mixing until a smooth consistency is obtained. Optionally, a biocide and a blueing agent are also added to the mixture. Suitable plasticizers include, without limitation, phthalates, dibenzoates and polymeric plasticizers such as Rohm & Haas WP-1 and K-Flex DP. Suitable coalescing solvents include, without limitation, ethylene glycol ethers, diethylene glycol ethers, propylene glycol ethers, dipropylene glycol ethers, hexylene glycol, n-butyl acetate and mono-isobutyrates. Suitable biocides include, without limitation, tributyltin salicylate, isothiazolinones and metal compounds having biocidal activity. Preferred biocides are Troysan Polyphase P-20-T, Kathon LX and Skane M-8. Suitable blueing agents include, without limitation, fluorescent brighteners well known in the art. The preferred blueing agent is Stilbene Fluorescent Brightener or Leucophor C-7002U. Suitable surface-active agents include, without limitation, well-known surfactants including sodium salts of organic carboxylic acids including sodium lauryl sulfate, potassium tripolyphosphate, petroleum-based defoamers and octylphenoxypolyethoxyethanol. Preferred surface-active agents are Foamaster 111 and Foamkill 639 J-OH. Suitable thickening agents include, without limitation, cellulosic thickening agents, polymeric thickening agents and laponite clay. Preferred thickening agents are Methocel 856 and ASE-60. Suitable fillers include, without limitation, talc, clay, silica and calcium carbonate.

If desired the base formulation is prepared by adding pigment or filler to a non-aqueous polymeric resin, or mixtures thereof, and mixing for a time sufficient to provide a substantially uniform base formulation. As in the aqueous-based formulations, the optional pigment or filler imparts a color to the non-aqueous-based base formulation, which aids in matching a particular surface. A variety of non-aqueous resins can be used to good advantage in the preparation of the caulking material of the present invention. Preferred resins include, but are not limited to; silicone resins (including, for example, acetoxy- and non-acetoxy cured silicone resins), single- and multiple component urethanes, natural and synthetic rubbers (such as styrene butadiene rubber and polychloropren) and the like. Other suitable non-aqueous-based resins include fluoroelastomers and, generally, any non-aqueous-based resins that can be formulated with a suitable pigment to provide the desired background color and which can be further formulated with granular solid colored particles dispersed therein. The resulting formulation may further include a number of non-aqueous-based components, such as conventional silicone caulks.

The wide variety of materials that can be incorporated into the base formulations of the adhesive caulking material provides great flexibility into the physical properties and characteristics of the end product. In the case of a polyurethane resin, the base formulation and resultant end product may be characterized as durable, flexible, waterproof, and weather resistant. The adhesive caulking material is completely odorless and contains no volatile organic compounds. It adheres to cast iron and most other metals, masonry, concrete glass, tile, vitreous china and porcelain. In the case of a fluoroelastomer non-aqueous-based base formulation, the resultant material is resistant to virtually all chemicals. Use of a non-aqueous two-part epoxy sealing putty formulation provides an adhesive caulking material that is electrically con-conductive and which can be ground, filed, sanded, or drilled. What is more, the adhesive caulking material having a silicone base is flexible, durable, mildew-resistant, waterproof and suitable for interior or exterior applications. Such an adhesive caulking material has especially excellent adhesive and groundable properties when applied to ceramic, metal, or plastic.

A very wide range of properties may also be obtained when a non-aqueous polychloropren synthetic rubber is used in this invention. The resulting adhesive caulking material can fall within a wide range of crystallization rates and viscosity. The crystallization rate determines the rate of initial strength development, and the viscosity influences the inherent strength of the resultant caulk. This synthetic rubber is oil resistant, resists degradation from sun, ozone and outdoor weather, is flexible over a wide temperature range, is very tough and resists burning. Formulation of the adhesive caulk material using natural rubber gives a product with different properties. This caulk has excellent resilience and rebound, can be used at a wide temperature range and has excellent adhesion to stone, ceramic, or metal surfaces.

The granular solid colored particles employed in this invention are selected from the granular solid colored chips of this invention and solid colored aggregate. Substantially all of the granular solid colored particles have a diameter after screening ranging from about 0.25 mm to about 20 mm, preferably from about 0.5 mm to about 13 mm. The diameter of the solid colored particles varies depending on the appearance of the surface the caulking material is intended to match. A surface having relatively large areas of different color and/or brightness from the background color or brightness is more closely matched by a caulk containing relatively large colored particles. The granular solid colored particles are flexible and pliant when mixed into the base formulation and remain so after the caulking material cures in place.

The granular solid colored chips of this invention comprise a mixture of coagulated or aggregated polymeric resin and one or more pigments which impart a single- or multi-colored appearance to the particles. In one embodiment of the present invention, the solid colored chips are produced by coagulation of a polymeric resin containing a pigment. The pigment is selected from the various colors of iron oxides, titanium dioxide, chromium oxides, and the organic pigments. The pigment is added either in the form of a solid pigment, or as a pigment dispersion well known to those skilled in the art, e.g., a dispersion of a solid pigment in oil or latex. Examples of pigments and dispersions suitable for use in this invention, without limitation, are RHD6-X Titanium Dioxide, Carmine Red W-3160 Dispersion, Chromium Oxide, Burnt Umber Iron Oxide, Iron Oxide Yellow, Phthalocyanine Blue W-4124 Dispersion, Phthalocyanine Green W-6013 Dispersion and Iron Oxide Black. In another embodiment of the present invention, the solid colored particles comprise solid colored aggregate, which is typically, but not necessarily, recycled solid polymeric material that has been granulated, shredded or ground. In a preferred embodiment of this invention, the solid colored particles comprise granulated, shredded or ground pieces of rubber or recycled tires.

The polymeric resin employed in production of the granular solid colored chips is any resin that can be coagulated in the presence of a pigment. The preferred resins are synthetic polymeric resins, including acrylics, styrene-acrylics, styrene-butadienes, vinyl acetates, ethylene-vinyl acetates, silicones and urethanes. Especially preferred are the acrylic resins that can be coagulated by the addition of a metal salt. The preferred metal salt is calcium chloride. Typically, the resin in the form of an aqueous emulsion is added to an aqueous solution of a metal salt at a rate effective to provide a coagulated pigmented resin. The mixture is stirred with a high-shear mixer. A surface-active agent is added to the mixture and the mixture is stirred for a time sufficient to provide granular solid colored chips, which are approximately in the desired size range. The chips obtained from this process are granular, i.e.; they are of irregular shape. If necessary, the particles are separated according to size to produce particles having the desired size range. A preferred method for separation according to size is straining through a screen, or sequentially straining through a plurality of screens having different opening sizes. Particles collected on a screen may be washed to remove any excess pigment. Preferably, hot water is used to wash the particles. The colored chips of this invention remain pliable after the caulking material is cured.

The following examples are presented in order to illustrate various aspects of the present invention, but are not intended to limit it.

5. EXAMPLES

5.1. Production of Granular Solid Colored Chips

5.1.1 Formation of Colored Chips

Rohm & Haas 1785 water-based resin (8.5 gallons, 32 liters) (available from Rohm & Haas Company, Philadelphia, Pa.) is added to a large mixing drum, and the drum is placed under a Cowles mixer (available from Morehouse Industries, Fullerton, Calif.). The mixer is started at 1300 RPM and the appropriate amount of pigment or dispersion is added to obtain the desired color. When the contents of the drum are thoroughly mixed, the mixer is turned off and the drum set aside.

Hot water (25 gallons, 94.5 liters) is added to a second large mixing drum, and the drum is placed under a Cowles mixer. The mixer is started at 1300 RPM. Calcium chloride (4.4 pounds, 2.0 kg) is added to the water and the mixture is stirred for 5 minutes or until all of the salt is dissolved.

While mixing is continued, the pigmented resin from the set-aside drum is slowly added to the salt solution. The resin is added carefully to avoid overly rapid coagulation, which can lead to an undesirable increase in particle size. Just as the last of the pigmented resin has been added to the salt solution, 180 g of Foamaster 111 surface-active agent (available from Henkel Corp., Ambler, Pa.) is added. The mixture is stirred until the colored chips are essentially in the desired size range, usually 5–10 minutes.

5.1.2. Straining the Pigment Chips from the Salt Solution

The pigmented chips are strained into a large drum covered with a ¼ inch (6.4 mm) metal screen to remove any oversize particles. The oversize particles are retained for use in another formula or discarded.

The pigmented chips from the drum are strained again into another drum covered with a standard window screen to remove any excess pigment. Hot water is used to flush the excess pigment from the pigmented chips on the screen. The drum is used to reclaim the salt solution and the excess pigment. As the screen fills up, the chips are removed to a separate 5 gallon (19 liter) pail for temporary or long-term storage under water. Continue until all pigmented chips have been washed and stored in this manner. Chips that are not used immediately are stored under water to prevent agglomeration.

5.2. Preparation of Standard Base Formula

As a standard water-based base formula, a translucent caulk is used. Commercially available translucent caulks can be used, such as Phenoseal® Vinyl Adhesive Caulk Translucent, which is available from Gloucester Company, Inc., Franklin, Mass.

Alternatively, an aqueous-based base formula can be prepared as follows: A 55 gallon (208 liter) drum is placed under a Cowles mixer and about 15–20 gallons (68 liters) of a water-based resin (e.g., CYP-101, available from Cypress Polymers, Inc., Babson Park, Mass.) is added. The mixer is started at 1300 RPM. To the resin is added about 1–5 gallons of plasticizer, about 1–5 gallons of coalescing solvent, about 100–200 g of a preservative and about 1000–5000 g of a thickening agent. Optionally, about 100–200 g of a blueing agent can be added, along with other optional ingredients, such as about 200–500 g of a defoamer and about 2000–7000 g of powdered silica. The resulting mixture is stirred until smooth.

Commercial plasticizers are available from Kalama Chemical, Garfield, N.J., coalescing solvents from Monson, Leominster, Mass., preservatives from Troy Chemical, Newark, N.J., blueing agents from Clariant Chemicals, Charlotte, N.C., defoamers from Henkel Corp., Ambler, Pa. and thickening agents from DOW Chemical, Midland, Mich. Commercial powdered silica can obtained from North America Silica Corp., Valley Forge, Pa.

In a preferred embodiment of the invention, the following components (with approximate amounts indicated in parenthesis) are mixed to produce the standard base formula: water-based resin (18 gallons or 68 liters); plasticizer (1.5 gallons or 5.7 liters); coalescing solvent (1.8 gallons or 6.8 liters); preservative (135 g); optional blueing agent (164 g); optional defoamer or surface active agent (235 g); thickening agent (1000–5000 g); and optional powdered silica (4500 g).

5.3. Preparation of Caulk

The drum of the preferred standard base formula mixture prepared in Example 5.2, above, is transferred to a Myers Planetary mixer (C. K. "Bud" Myers Engineering, Inc., Bell, Calif.). While mixing, an appropriate amount of pigment is added to reach the desired base background color. Foamaster 111 surface-active agent (about 84 g) (available from Henkel Corp., Ambler, Pa.) is added, and the contents of the drum are mixed until the color is uniform, ca. 5–10 minutes. The sweeper blades are cleaned during the mixing process to ensure that all pigment is incorporated into the mixture.

An appropriate amount of pigmented chips produced in Example 5.1 is added to obtain the desired appearance; mixing is continued for no more than about 5 minutes. Then, about 31 pounds (ca. 14 kg) of IT-3X talc filler (available from R. T. Vanderbilt Co., Norwalk, Conn.) and about 3.7 pounds (ca. 1.7 kg) of Sipernat 22 LS fumed silica (available from North America Silica Corp., Valley Forge, Pa.) are added and the contents mixed for 5 minutes. The sweeper blades are cleaned during mixing to ensure complete incorporation of filler.

The contents are then vacuum mixed at a minimum of 22 mm Hg for 10 minutes to remove entrapped air from the contents. The drum is removed from the Myers mixer.

5.4. Use of Polyurethane Base Formulation

A non-aqueous-based (that is, non-water-based) base formulation can also be used to good advantage in the preparation of the adhesive caulking material of the present invention. In particular, a polyurethane base formulation can be used. A single-component polyurethane sealant, NEW PLASTIC SEAL (available from Hercules Chemical Co, Inc., Passaic, N.J.), is substituted for the base formula mixture of Example 5.2. The adhesive caulking material of the present invention is then prepared as described in Example 5.3.

5.5. Use of Fluoroelastomer Base Formulation

A non-aqueous-based base formulation can also be used to good advantage in the preparation of the adhesive caulking material of the present invention. In particular, a fluoroelastomer base formulation can be used. A single-component fluoroelastomer, VITON (available from DuPont Dow Elastomers, L.L.C., Wilmington, Del.), is substituted for the base formula mixture of Example 5.2. The adhesive caulking material of the present invention is then prepared as described in Example 5.3.

5.6. Use of Silicone Base Formulation

A non-aqueous-based base formulation can also be used to good advantage in the preparation of the adhesive caulking material of the present invention. In particular, a silicone base formulation can be used. A non-aqueous-based silicone base formulation is available from Dow Corning, Co., Midland, Mich. This caulk formulation, which is available in a variety of colors, is substituted for the base formula mixture of Example 5.2. A clear silicone base formulation can be colored by the addition of pigments, as appropriate. The adhesive caulking material of the present invention is then prepared as described in Example 5.3.

5.7. Use of Epoxy Base Formulation

A two-part epoxy sealing putty base formulation, available from Hercules Chemical Co, Inc., Passaic, N.J., which contains a two-part component, is substituted for the base formula mixture of Example 5.2. The adhesive caulking material of the present invention is then prepared as described in Example 5.3. The hardener component is added to the mixture and thoroughly mixed just before the caulk is applied.

5.8. Use of Synthetic Rubber Base Formulation

A non-aqueous based synthetic rubber base formulation can be used to advantage in the present invention. A synthetic rubber, polychloropren, is available from DuPont Dow Elastomers L.L.C., Wilmington, Del. The base formulation utilizing this synthetic rubber is substituted for the base formula mixture of Example 5.2. In particular, the synthetic rubber can be dissolved in a suitable amount of toluene. Neoprene WHVA is a special grade of neoprene with a moderate crystallization rate and high viscosity. The adhesive caulking material of the present invention is then prepared as described in Example 5.3.

5.9. Use of Natural Rubber Base Formulation

Natural rubber, also called polyisoprene, suitable for use in a base formulation is available from Baxter Rubber Co., Fairfield, N.J. The rubber-base base formulation is substituted for the base formula mixture of Example 5.2. The polyisoprene is dissolved in an appropriate aromatic hydrocarbon, such as toluene, before being added to the mixer. The adhesive caulking material of the present invention is then prepared as described in Example 5.3.

The preceding Examples are intended to describe certain preferred embodiments of the present invention. It should be appreciated, however, that obvious additions and modifications of the invention will be apparent to one skilled in the art. The invention is not limited except as set forth in the claims.

What is claimed is:

1. Granular solid colored chips comprising a coagulated or aggregated mixture comprising a polymeric resin and an amount of one or more pigments sufficient to obtain a desired single- or multi-colored appearance, said chips having a granular shape and having a size ranging from about 0.25 mm to about 20 mm in diameter.

2. The granular solid colored chips of claim 1 in which said polymeric resin comprises a water-based resin selected from acrylic, styrene-acrylic, styrene-butadiene, ethylene vinyl acetate, vinyl acetate, or urethane resins.

3. The granular solid colored chips of claim 1 in which said one or more pigments is selected from iron oxides, titanium dioxide, chromium oxides and organic pigments.

4. The granular solid colored chips of claim 1 in which said coagulated or aggregated mixture further comprises a surface-active agent.

5. A process for the preparation of granular solid colored chips comprising:
   (a) mixing a polymeric resin and one or more pigments or pigment dispersions until a substantially uniformly dispersed resin mixture is obtained; and
   (b) adding said substantially uniformly dispersed resin mixture to a stirred salt solution at an addition rate effective to provide a coagulated or aggregated pigmented resin mixture containing solid colored chips having a granular shape, a majority of which granular solid colored chips having a diameter falling within a desired range.

6. The process of claim 5 which further comprises mixing a surface-active agent with said coagulated or aggregated pigmented resin mixture.

7. The process of claim 6 which further comprises separating said granular solid colored chips into at least two separate portions according to size.

8. The process of claim 7 in which said separation step includes straining said granular solid colored chips through one or more screens.

9. The process of claim 7 which further comprises washing at least one of said portions to remove excess pigment.

10. The process of claim 9 in which said granular solid colored chips are stored under water.

11. A solid material comprising:
    (a) a solid substrate comprising a plurality of sections with gaps therebetween; said substrate having a speckled or grainy appearance; and
    (b) a curable adhesive caulking material comprising granular solid colored particles dispersed in a base formulation, said adhesive caulking material substantially filling said gaps and essentially matching said speckled or grainy appearance.

12. A method of repairing a damaged natural or synthetic solid substrate comprising applying in, on, or about the damaged area an effective amount of an adhesive caulking material comprising granular solid colored particles dispersed in a base formulation, which adhesive caulking material exhibits a cosmetic capacity to take on the appearance of a natural or synthetic solid substrate.

13. The method of claim 12 in which the damage comprises a chip, crack, or break.

* * * * *